United States Patent
Toyoshima et al.

(10) Patent No.: US 6,477,990 B2
(45) Date of Patent: Nov. 12, 2002

(54) HEAT STORAGE TANK IN COOLING WATER CIRCUIT

(75) Inventors: Takashi Toyoshima, Obu (JP); Toshio Morikawa, Toyota (JP); Ikuo Ochi, Toyota (JP); Koichi Ban, Tokai (JP); Sadahisa Onimaru, Chiryu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 09/970,915

(22) Filed: Oct. 4, 2001

(65) Prior Publication Data

US 2002/0040693 A1 Apr. 11, 2002

(30) Foreign Application Priority Data

Oct. 11, 2000 (JP) .......................................... 2000-310869
Jul. 26, 2001 (JP) .......................................... 2001-226223

(51) Int. Cl.$^7$ ................................................. F01P 11/02
(52) U.S. Cl. .................................................... 123/41.14
(58) Field of Search ...................................... 123/41.14

(56) References Cited

U.S. PATENT DOCUMENTS 5,749,329 A  *  5/1998  Thurfjell .............. 123/142.5 R
5,896,833 A      4/1999  Aoki et al.

FOREIGN PATENT DOCUMENTS

JP          B2-2827208          9/1998

* cited by examiner

Primary Examiner—Noah P. Kamen
(74) Attorney, Agent, or Firm—Harness, Dickey & Pierce, PLC

(57) ABSTRACT

In a heat storage tank, first and second valve bodies are disposed to open and close first and second valve ports, respectively. A density of the first valve body is made larger than that of cooling water, and a density of the second valve body is made smaller than that of cooling water. When the dynamic pressure due to cooling water is applied to the first and second valve bodies, the first and second valve ports are opened by the first and second valve bodies. On the other hand, when the dynamic pressure is not applied to the first and second valve bodies, the first valve body closes the first valve port by the weight of the first valve body, and the second valve body closes the second valve port by the buoyancy.

17 Claims, 10 Drawing Sheets

HEAT STORAGE TANK IN COOLING WATER CIRCUIT

CROSS-REFERENCE TO RELATED APPLICATION

This application is related to Japanese Patent Applications No. 2000-310869 filed on Oct. 11, 2000, and No. 2001-226223 filed on Jul. 26, 2001, the contents of which are hereby incorporated by reference.

BACKGROUND OF THE INVENTION

1. Field of the Invention

The present invention relates to a heat storage tank which stores a cooling liquid of a liquid-cooled engine. For example, the heat storage tank is suitably used for a vehicle having a water-cooled engine.

2. Description of Related Art

In a conventional heat storage tank described in JP-A-10-77839, the flow of cooling water is controlled by an electric valve. Because the electric valve is used for controlling the flow of cooling water in the heat storage tank, the number of components is increased, a structure of the heat storage tank becomes complex, and the production cost of the heat storage tank is increased.

SUMMARY OF THE INVENTION

In view of the foregoing-problems, it is an object of the present invention to provide a heat storage tank which is manufactured with a reduced cost.

According to the present invention, in a heat storage tank for storing a cooling liquid of a liquid-cooled engine, a fluid passage communicating with an interior of a tank body is provided. A valve body for opening and closing the fluid passage is constructed to open the fluid passage when a dynamic pressure applied to the valve body by the cooling liquid is larger than a predetermined pressure, and to close the fluid passage when the dynamic pressure applied to the valve body by the cooling liquid is smaller than the predetermined pressure. Accordingly, the flow passage can be accurately opened and closed without using an electric valve. Therefore, the heat-storage tank can be manufactured with a reduced cost.

Preferably, the valve body is constructed to close the fluid passage by a density difference between the cooling liquid and the valve body when the dynamic pressure applied to the valve body is smaller than the predetermined pressure. Alternatively, the valve body is constructed to close the fluid passage by a pressure due to the weight of the valve body and the weight of the cooling liquid when the dynamic pressure applied to the valve body is smaller than the predetermined pressure. Therefore, the structure of the valve body can be made simpler in the heat storage tank.

The cooling liquid circuit includes a first liquid circuit having at least a radiator for cooling the cooling liquid, and a second liquid circuit including the heat storage tank. A pump is disposed in the second liquid circuit so that cooling liquid circulates between the second liquid circuit and the liquid-cooled engine independently from the first liquid circuit. Therefore, high-temperature cooling liquid stored in the heat storage tank can be directly supplied to the engine without being affected by operation of the first liquid circuit. Thus, heating operation of the engine can be effectively facilitated.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
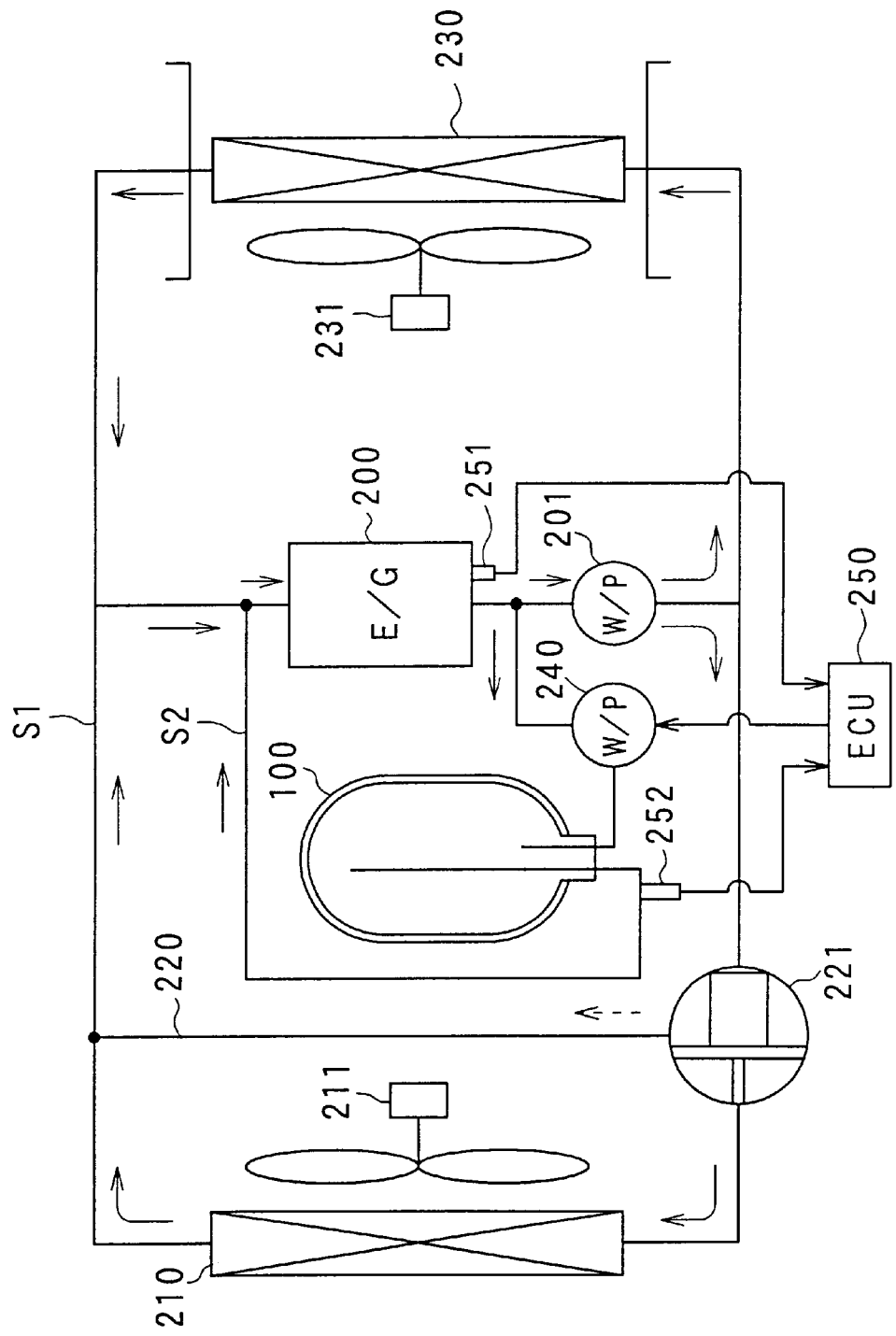
FIG. 1 is a schematic diagram showing a cooling water circuit according to a first preferred embodiment of the present invention.

Preferred embodiments of the present invention will be described hereinafter with reference to the accompanying drawings.

A first preferred embodiment of the present invention will be now described with reference to FIGS. 1–4. In the first embodiment, a heat storage tank 100 of the present invention is typically used for a cooling water circuit of a water-cooled engine 200 for a vehicle.

The water-cooled engine 200 is disposed in the cooling water circuit to be cooled by cooling water flowing through the engine 200. A radiator 210 is disposed to cool the cooling water by performing a heat exchange between cooling water and air. A bypass passage 220 through which cooling water bypasses the radiator 210 is provided, and a thermo-control valve 221 (thermostat) is disposed to adjust the flow amount of cooling water flowing through the bypass passage 220 and the flow amount of cooling water flowing through the radiator 210. The thermo-control valve 221 (thermostat) adjusts the ratio between the flow amount of cooling water flowing through the bypass passage 220 and the flow amount of cooling water flowing through the radiator 210, so that the temperature of the engine 200 can be controlled to a predetermined temperature.

A blower 211 is disposed to blow cooling air (outside air) toward the radiator 210. A heater core 230 is disposed to heat air blown into a passenger compartment using cooling water in the cooling water circuit as a heating source, and a blower 231 is disposed for blowing air to the heater core 230.

In the first embodiment, the cooling water circuit includes a first cooling water circuit S1 through which cooling water in the engine 200 circulates between the radiator 210, the bypass circuit 220 and the heater core 230, and a second cooling water circuit S2 through which cooling water circulates between the heat storage tank 100 and the engine 200. A first pump 201 driven by power from the engine 200 is disposed in the first cooling water circuit S1 to circulate cooling water in the first cooling water circuit S1, and a second pump 240 driven electrically is disposed in the second cooling water circuit S2 to circulate cooling water in the second cooling water circuit S2.

The second cooling water circuit S2 is constructed so that cooling water flowing from the engine 200 flows into the heat storage tank 100 and cooling water flowing from the heat storage tank 100 flows into the engine 200. Because cooling water independently circulates in the second cooling water circuit S2 by the second pump 240, the flow of cooling water in the second cooling water circuit S2 can be independently controlled without being affected by the flow of cooling water in the first cooling water circuit S1.

A first temperature sensor 251 for detecting temperature (i.e., temperature of cooling water circulating in the engine 200) of the engine 200 is disposed in the engine 200, and a second temperature sensor 252 is disposed for detecting temperature of cooling water (hot water) flowing out from the heat storage tank 100. Detection signals from both the temperature sensors 251, 252 are input into an electronic control unit (ECU) 250, and the ECU 250 controls the operation of the second pump 240 based on the detection signals of both the temperature sensors 251, 252.

Figure 2:
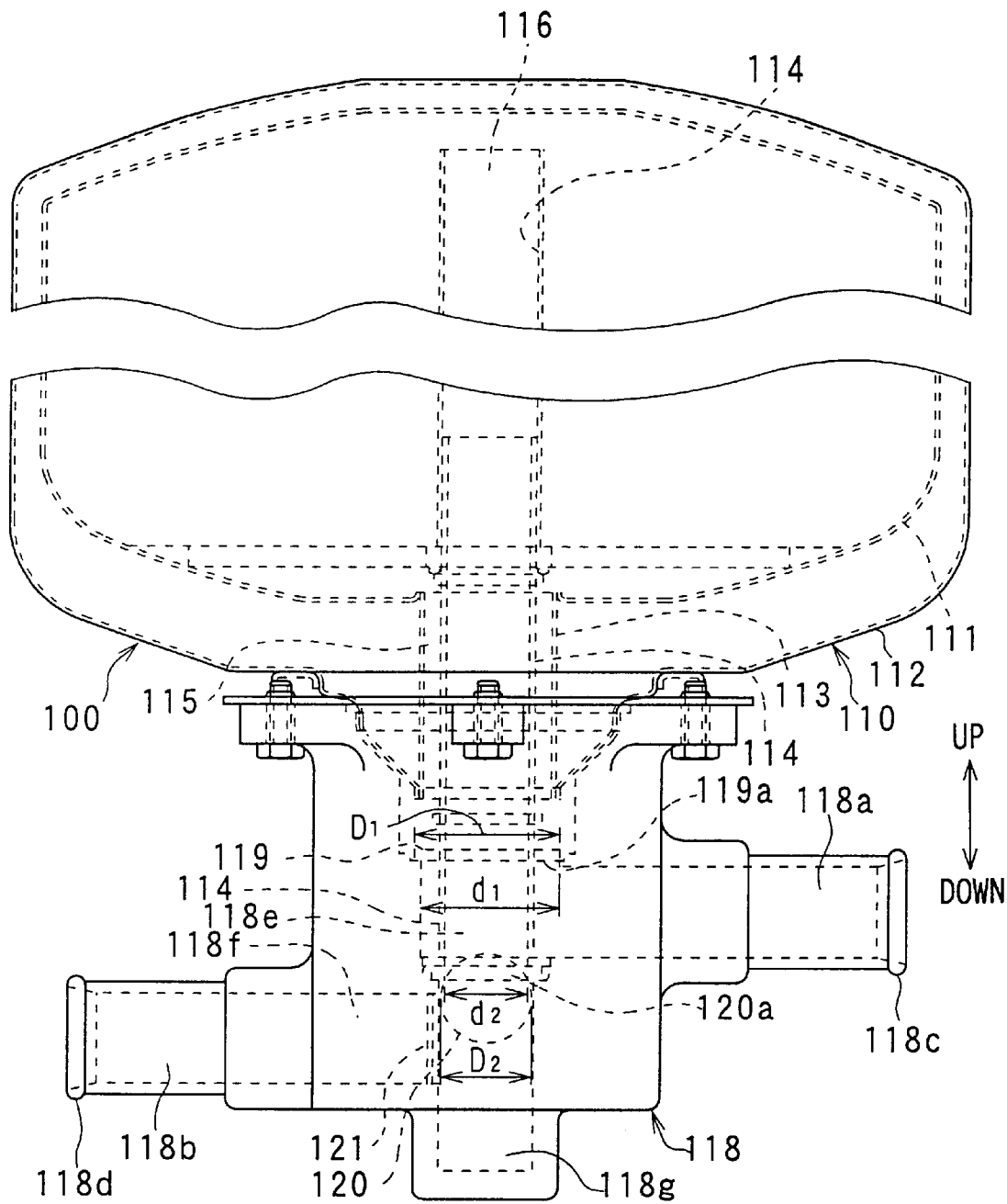
FIG. 2 is a schematic diagram of a heat storage tank according to the first embodiment.

Next, the heat storage tank 100 will be now described in detail with reference to FIG. 2. As shown in FIG. 2, the heat storage tank 100 has a tank body 110, and the tank body 110 is constructed by a double structure composed of an inner tank portion 111 made of a material having a sufficient corrosion resistance such as a stainless metal, and an outside tank 112. A space between the tank portions 111, 112 is substantially evacuated to form a heat insulating layer.

A first pipe member 113 is inserted into a lower side position of the tank body 110 to be welded to both tank portions 111, 112 of the tank body 110, so that an interior of the tank body 110 communicates with an exterior of the tank body 110 through the first pipe member 113. A second pipe member 114 made of a material having a sufficient heatinsulating performance, such as a nylon resin, is disposed in the first pipe member 113 concentrically with the first pipe member 113. The second pipe member 114 is inserted into the tank portions 111, 112 of the tank body 110 to extend vertically. A flow passage 115 (first flow passage) through which cooling water in the second cooling water circuit S2 flows into the tank body 110 is defined between the first pipe member 113 and the second pipe member 114, and the second pipe member 114 defines therein a flow passage (second flow passage) through which cooling water stored in the tank body 110 flows out. Therefore, cooling water flowing from the engine 200 flows into the tank body 110 of the heat storage tank 100 after passing through the flow passage 115 upwardly from below.

An introduction port 116 is opened in the second pipe member 114 within the tank body 110 at a position higher than the flow passage 115 and lower than a liquid surface of cooling water stored within the tank body 110. Therefore, cooling water introduced into the second pipe member 114 from the introduction port 116 flows through the second pipe member 114 from an upper side downwardly, and then flows to an outside of the tank body 110 of the heat storage tank 100.

Figure 3:
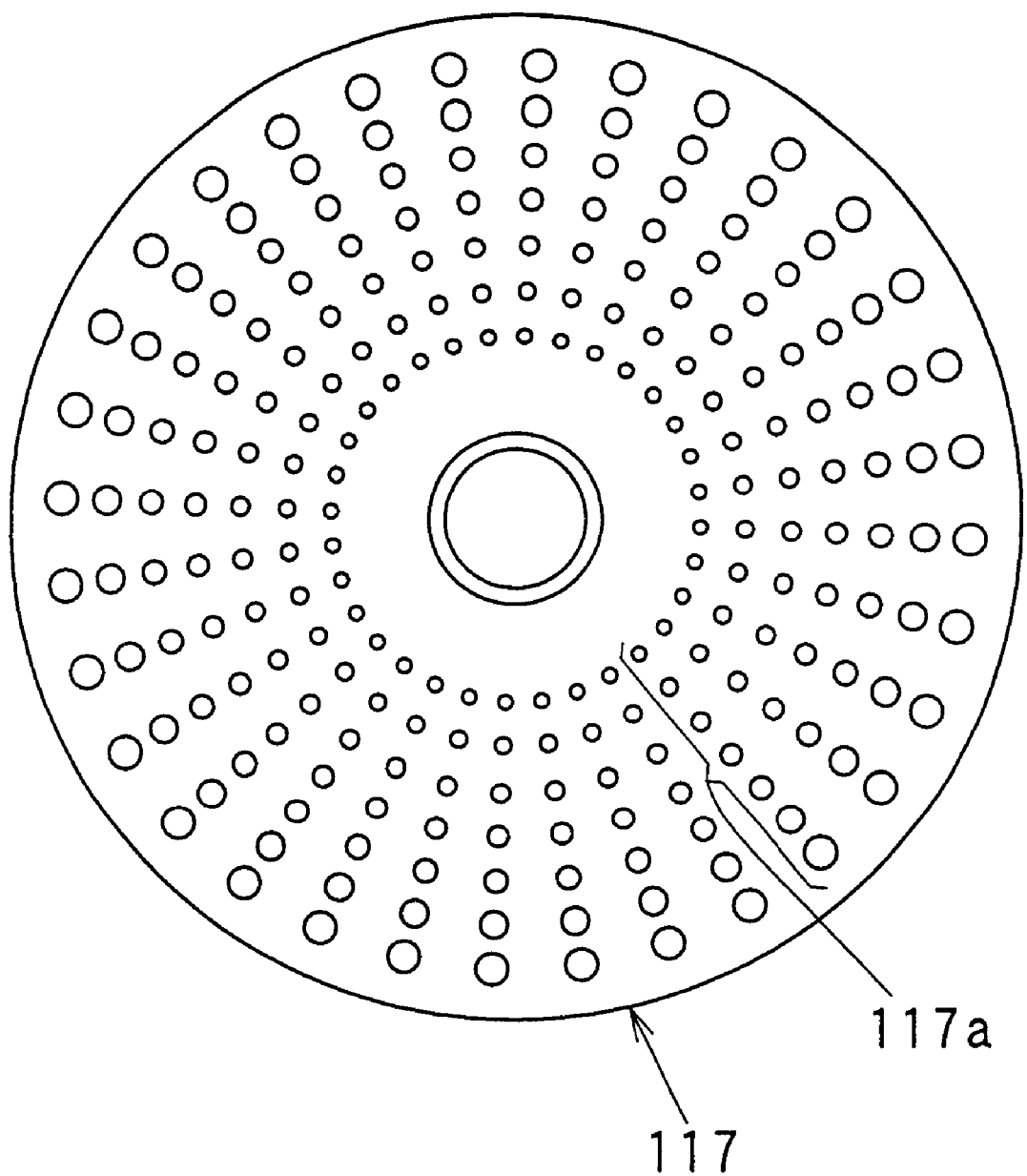
FIG. 3 is a front view of a plate member used for restricting the mixing of cooling water in the heat storage tank according to the first embodiment.

A circular plate member 117 for restricting mixing of cooling water in the tank body 110 is disposed within the tank body 110 at a lower side which is lower than the introduction port 116, so that cooling water flowing vertically upwardly from the flow passage 115 collides with the plate member 117. As shown in FIG. 3, the plate member 117 has plural through holes 117a penetrating through the plate member 117 in the thickness direction. The through holes 117a are provided in such a manner that radial dimensions of the through holes 117a are increased as the through holes 117 are positioned radially outward.

In FIG. 2, a housing 118 is disposed at a lower side of the tank body 110. The housing 118 defines a flow passage 118a communicating with the flow passage 115, and a flow passage 118b communicating with the flow passage of the second pipe member 114. Connection pipes 118c, 118d for connecting a pipe of the second cooling water circuit S2 and the flow passages 118a, 118b are formed in the housing 118. The tank body 110 is assembled to the vehicle through the housing 118.

The housing 118 is made of a material similar to that of the second pipe member 114. While the housing 118 is fixed to the tank body 110, the second pipe member 114 is inserted into the plate member 117 and into the housing 118 to be fixed.

A ring-plate like first valve body 119 is disposed for opening and closing the flow passage 118a. The first valve body 119 is constructed to open the flow passage 118a when dynamic pressure more than a predetermined pressure, due to cooling water, is applied to the first valve body 119 from below, and to close the flow passage 118a when the dynamic pressure lower than the predetermined pressure is applied to the first valve body 119 from below. Specifically, an opening diameter d1 of a first valve port 119a which is opened and closed by the first valve body 119 is made smaller than an outer diameter of the first valve body 119, and the first valve body 119 is disposed at an upper side of the first valve port 119a. In addition, the density of the first valve body 119 is made larger than that of the cooling water. For example, a specific gravity of the first valve 119 is approximately 1.64.

Figure 4:
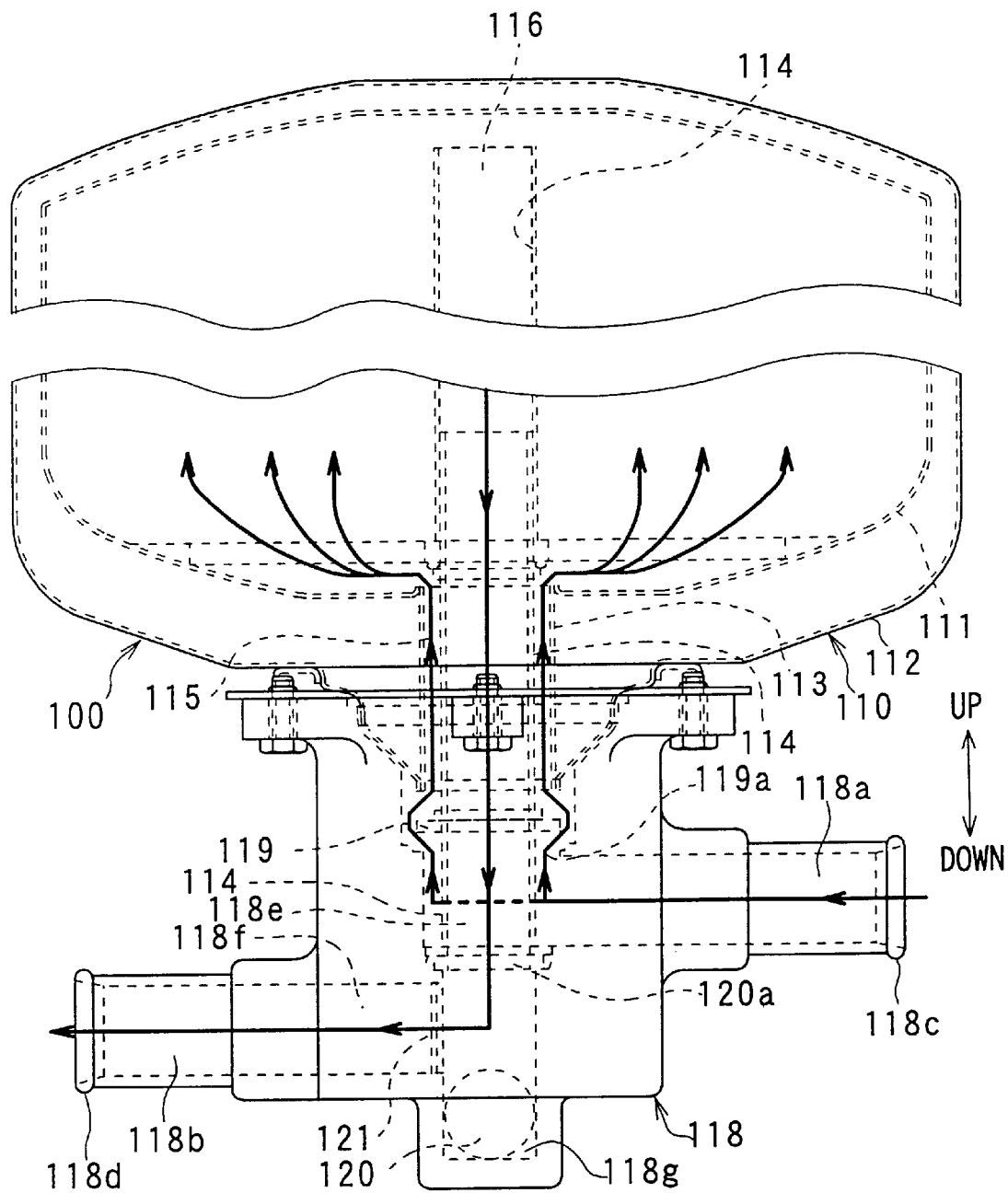
FIG. 4 is a schematic diagram showing the flow of cooling water in the heat storage tank of the first embodiment.

Accordingly, when cooling water flows by the operation of the second pump 240, dynamic pressure is applied to the lower side of the first valve body 119. Therefore, as shown in FIG. 4, the first valve body 119 moves upwardly, and the first valve port 119a (i.e., the flow passage 115) is opened. Conversely, when the operation of the second pump 240 is stopped, the dynamic pressure due to cooling water is not applied to the lower side of the first valve body 119. In this case, as shown in FIG. 2, the first valve body 119 moves downwardly, and closes the first valve port 119a. When the first valve port 119a is closed by the first valve body 119, the first valve port 119a (flow passage 118a) is closed by the weight of the first valve body 119 and weight of cooling water above the first valve body 119. Therefore, the flow passage 118a (first valve port 119a) can be accurately closed by the first valve body 119.

Further, in the first embodiment, a sphere-shaped second valve body 120 is disposed for opening and closing the flow passage 118b (second valve port 120a). The second valve body 120 is constructed to open the flow passage 118b when dynamic pressure larger than a predetermined pressure, due to cooling water, is applied to the second valve body 120 from an upper side of the second valve body 120, and to close the flow passage 118b when the dynamic pressure lower than the predetermined dynamic pressure is applied to the second valve body 120 from the upper side of the second valve body 120. Specifically, an opening diameter d2 of a second valve port 120a opened and closed by the second valve body 120 is made smaller than an outer diameter D2 of the second valve body 120, and the second valve body 120 is disposed at a lower side of the second valve port 120a. In addition, the density of the second valve body 120 is made smaller than that of the cooling water. For example, a specific gravity of the second valve 120 is approximately 0.98.

Accordingly, when cooling water flows by the operation of the second pump 240, dynamic pressure is applied to the upper side of the second valve body 120. Therefore, as shown in FIG. 4, the second valve body 120 moves downwardly, and the second valve port 120a (i.e., the flow passage 118b) is opened. Conversely, when the operation of the second pump 240 is stopped, the dynamic pressure is not applied to the upper side of the second valve body 120. In this case, as shown in FIG. 2, the second valve body 120 moves upwardly due to the buoyancy, and closes the second valve port 120a. A valve-closing force for closing the second valve port 120a (flow passage 118b) is a force due to a density difference between the second valve body 120 and the cooling water. However, the valve-closing force is sufficient for preventing flow of cooling water between an interior of the heat storage tank 100 and an exterior of the heat storage tank 100, due to a temperature difference between the interior and the exterior of the heat storage tank 100.

In the first embodiment of the present invention, the flow passage 118b is bent to have a vertical passage portion 118e extending approximately vertically, and a horizontal passage portion 118f extending approximately horizontally. Further, the second valve body 120 and the second valve port 120a are provided in a connection portion where the vertical passage portion 118e and the horizontal passage portion 118f are connected. Accordingly, when the second valve body 120 moves to the lower side due to the dynamic pressure, the horizontal passage 118f may be throttled by the second valve body 120. However, in the first embodiment of the present invention, a recessed receiving portion 118g is provided in the housing 118 at a position lower than the connection portion between the vertical passage portion 118e and the horizontal passage portion 118f. Therefore, when the dynamic pressure is applied to the upper side of the second valve body 120 from the upper side, the second valve body 120 is received in the receiving portion 118g, and it can prevent the horizontal passage portion 118f from being restricted.

In addition, a comb-like guide member 121 is disposed to prevent the second valve body 120 from flowing toward the connection pipe 118d. In the first embodiment of the present invention, both the valve bodies 119, 120 are made of a ternary copolymerization rubber of ethylene, propylene and diene (EPDM). However, by changing the polymerization degree of the EPDM, the density of the first valve body 119 can be readily made different from that of the second valve body 120.

Next, operation of the cooling water circuit according to the first embodiment of the present invention will be now described.

(1) Heat Storage Mode

The heat storage mode is performed, when the engine 200 operates and when the temperature T1 (i.e., temperature detected by the first temperature sensor 251) of cooling water flowing from the engine 200 is equal to or higher than a predetermined temperature To. Specifically, in the heat storage mode, high-temperature cooling water flowing from the engine 200 is supplied to the heat storage tank 100 by the operation of the second pump 240, and is stored in the tank body 110 of the heat storage tank 100. The predetermined temperature To is set at a temperature at which a heating operation of the engine 200 can be considered to be finished in an engine-heating mode. For example, in the first embodiment of the present invention, the predetermined temperature is 80.

(2) Engine-heating Mode

The engine-heating mode is performed when the operation of the engine 200 starts. That is, in the engine-heating mode, at the same time as the starting of the engine 200, the second pump 240 is operated. Therefore, in the engine-heating mode, high-temperature cooling water stored in the heat storage tank 100 is supplied to the engine 200, and the heating operation of the engine 200 is facilitated.

In addition, even in a heating operation for heating the passenger compartment using the heater core 230 in the winter, high-temperature cooling water stored in the heat storage tank 100 can be supplied to the heater core 230 from a time immediately after the start of the operation of the engine 200. Therefore, in the heating operation, the passenger compartment can be readily and quickly heated.

(3) Cooling Water Holding Mode (First Holding Mode)

The cooling water holding mode is performed when the temperature T2 (i.e. the temperature detected by the second temperature sensor 252) of cooling water flowing from the heat storage tank 100 is lower than the predetermined temperature To when the engine 200 operates. In the cooling water holding mode, the operation of the second pump 240 is stopped. The cooling water holding mode is changed from the engine-heating mode when all the high-temperature cooling water stored in the heat storage tank 100 flows out in the engine-heating mode. Therefore, it can prevent low-temperature cooling water flowing from the engine 200 from being stored in the heat storage tank 100 and from flowing into the engine 200. Accordingly, the heating operation of the engine 200 can be further facilitated.

When a capacity of the tank body 110 is set more than an amount of cooling water in the engine 200, the heating operation of the engine 200 can be further effectively facilitated. When the temperature T1 of cooling water flowing from the engine 200 is higher than the predetermined temperature To, the heat storage mode is set from the cooling water holding mode.

4. Hot Water Holding Mode (Second Holding Mode)

The hot water holding mode is performed when the operation of the engine 200 stops. In the hot water holding mode, the operation of the second pump 240 stops, and high-temperature cooling water (hot water) stored in the heat storage tank 100 during the heat storage mode is stored.

According to the first embodiment of the present invention, the first and second valve ports 119a and 120a (flow passages 118a and 118b) are opened and closed by the dynamic pressure applied to the first and second valve bodies 119, 120, respectively. Therefore, the structure of a valve portion for controlling a flow of cooling water in the heat storage tank 100 can be made simple, and the number of components for the valve member can be reduced. Thus, the heat storage tank 100 can be manufactured with a reduced cost.

In the first embodiment of the present invention, the second cooling water circuit S2 provided with the heat storage tank 100 is provided separately and independently from the first cooling water circuit S1 having the heater core 230 and the radiator 210. Therefore, high-temperature cooling water can be directly supplied to the engine 200 from the heat storage tank 100 at a requisite time without being affected by the operation of the heater core 230 or the radiator 210. Thus, the heating operation of the engine 200 can be effectively facilitated.

The tank body 110 has the double tank structure with a sufficient heat-insulating performance. However, in an opening portion of the tank body 110, where the first pipe member 113 and the second pipe member 114 are inserted, the interior of the tank body 110 is thermally connected to an exterior of the tank body 110. Therefore, heat of hot water (cooling water) in the tank body 110 is readily radiated from the opening portion of the tank body 110. On the other hand, the temperature of hot water in the tank body 110 is lower at a lower position in the tank body 110. Thus, in the first embodiment, the opening portion of the tank body 110 is provided at a lower side position of the tank body 110 so that a temperature difference between the interior and the exterior of the tank body 110 is made smaller in the opening portion of the tank body 110. Accordingly, in the first embodiment, a heat radiation from the opening portion of the tank body 110 can be reduced, and the heat-insulating performance of the tank body 110 can be improved.

Figure 5:
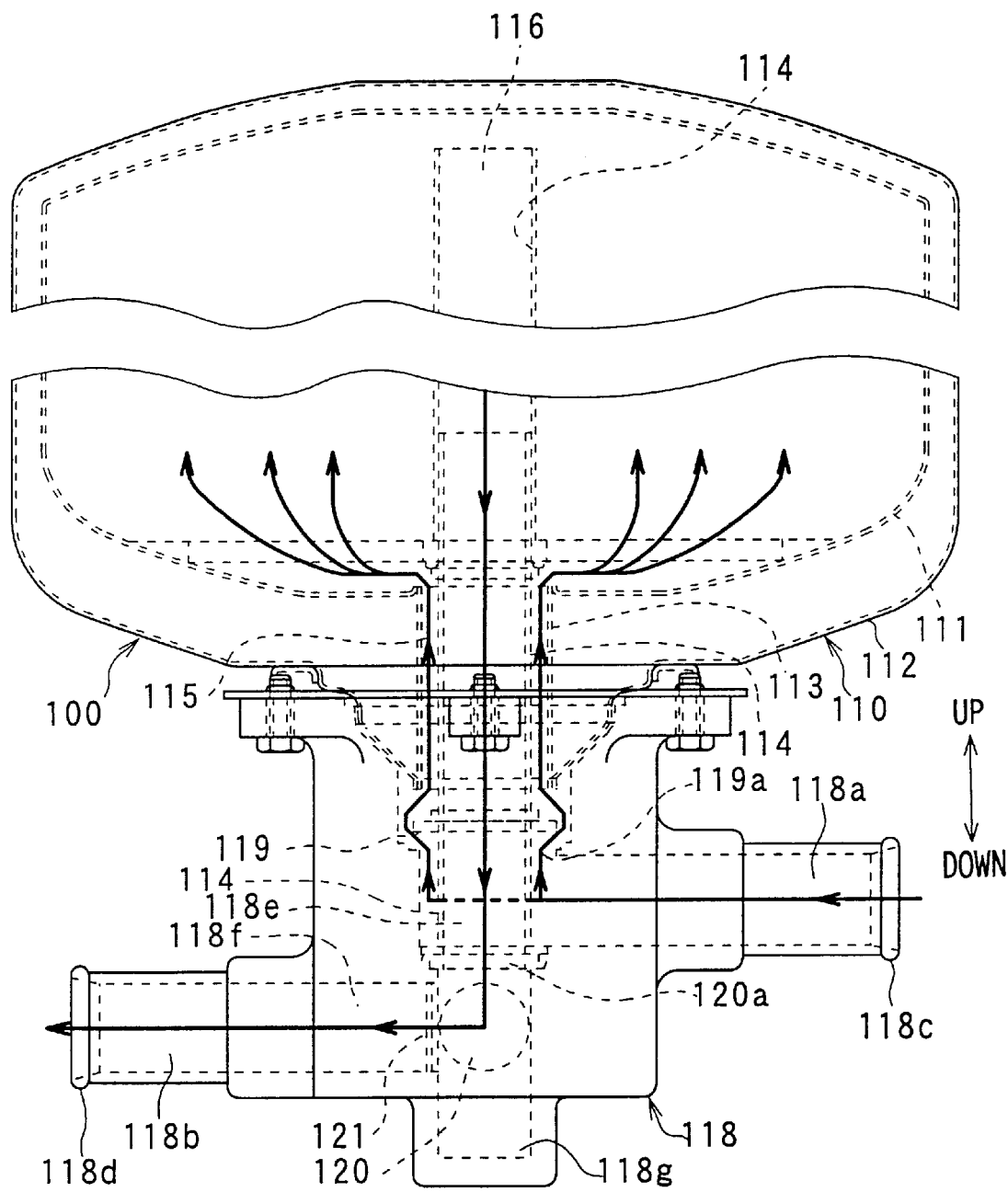
FIG. 5 is a schematic diagram showing a heat storage tank according to a comparison example of a second preferred embodiment of the present invention.

A second preferred embodiment of the present invention will be now described with reference to FIGS. 5 and 6. In the above-described first embodiment of the present invention, when the second pump 240 operates, the second valve body 120 is pressed downwardly by the dynamic pressure applied to the second valve body 120. However, by a balance between the dynamic pressure applied to the second valve body 120 and the buoyancy applied to the second valve body 120, the second valve body 120 may be not moved into the receiving portion 118g, but may be moved to a position (guide member 121) corresponding to the horizontal passage portion 118f as shown in FIG. 5. When the second valve body 120 is positioned at the position corresponding to the horizontal passage portion 118f as shown in FIG. 5, the flow of cooling water in the horizontal passage portion 118f is restricted by the second valve body 120, and a flow resistance of cooling water is increased.

Figure 6:
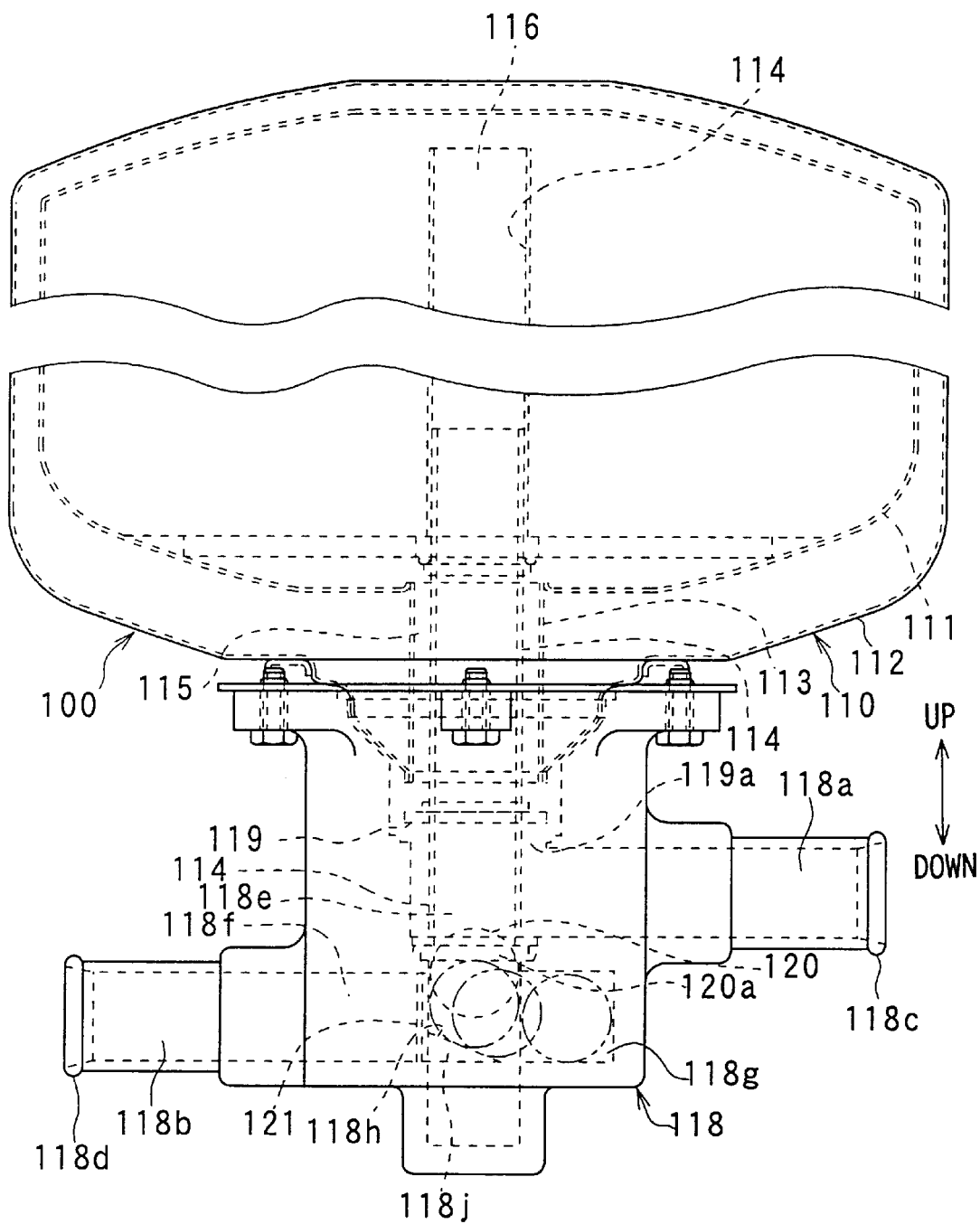
FIG. 6 is a schematic diagram showing a heat storage tank according to the second embodiment.

Accordingly, in the second embodiment of the present invention, as shown in FIG. 6, a receiving portion 118g for receiving the second valve body 120 is provided at a side opposite to the horizontal passage portion 118f. That is, at both opposite sides of the connection portion between the vertical passage portion 118e and the horizontal passage portion 118f, the horizontal passage portion 118f and the receiving portion 118g are provided opposite to each other. In addition, a guide portion 118j having a tapered surface 118h is provided in the connection portion so that the second valve body 120 moves into the receiving portion 118g by the guiding of the tapered surface 118h.

Thus, in the second embodiment, it can prevent the flow of cooling water from being restricted by the second valve body 120 when the dynamic pressure is applied to second valve body 120, and it can prevent the flow resistance of cooling water from being increased.

Figure 7:
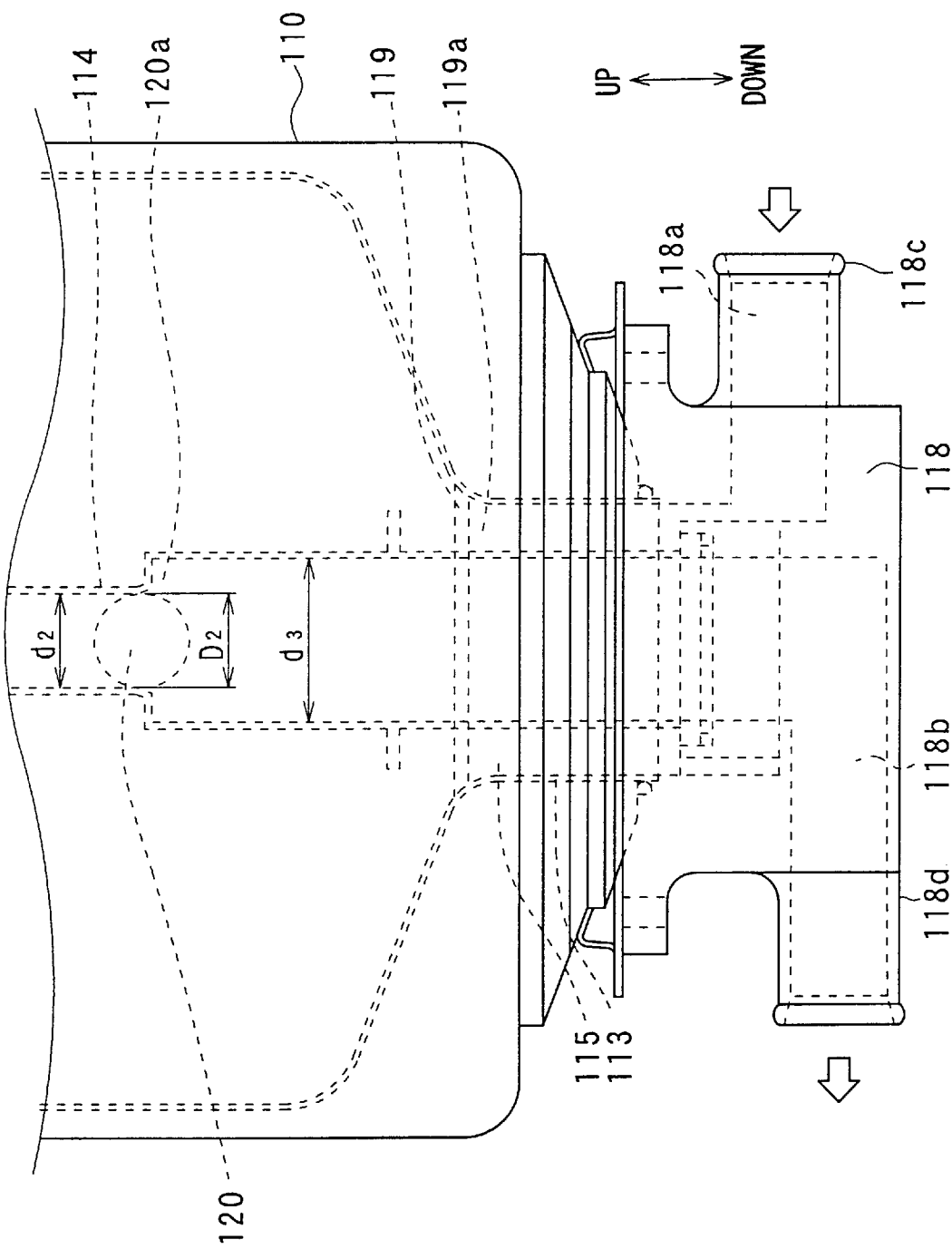
FIG. 7 is a schematic diagram showing a heat storage tank according to a third preferred embodiment of the present invention.
Figure 8:
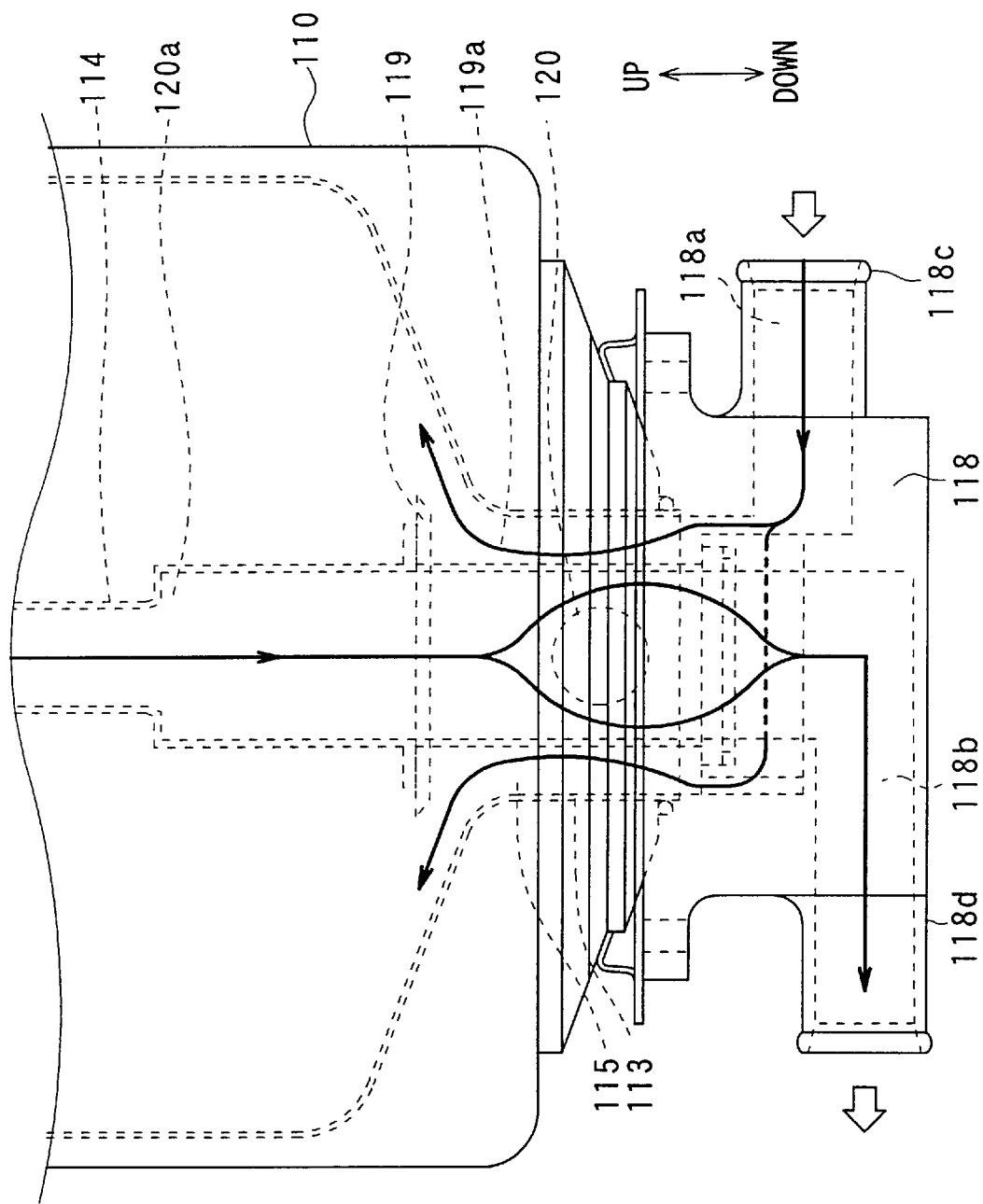
FIG. 8 is a schematic diagram showing the flow of cooling water in the heat storage tank according to the third embodiment.

A third preferred embodiment of the present invention will be now described with reference to FIGS. 7 and 8. As shown in FIGS. 7 and 8, in the third embodiment of the present invention, the second valve body 120 is disposed inside the second pipe member 114 to be positioned within the tank body 110. Accordingly, in the third embodiment, the receiving portion 118g described in the first and second embodiments is unnecessary, and a size of the housing 118 can be reduced.

In the third embodiment, the second pipe member 114 is provided in such a manner that, a hole diameter d2 of a pipe part from the second valve port 120a toward the introduction port 116 is made smaller than the diameter D2 of the second valve body 120, and a hole diameter d3 of a pipe part from the second valve port 120a toward the housing 110 (downside) is made larger than the diameter D2 of the second valve body 120. The second pipe member 114 is provided with a male screw portion (not shown) at a lower side end, and the male screw portion of the second pipe member 114 is screwed into a female screw portion provided in the housing 118 so that the second pipe member 114 is fixed to the housing 118.

Accordingly, in the third embodiment of the present invention, when the dynamic pressure is applied to the second valve body 120 by the operation of the second pump 240, cooling water flowing from the second valve port 120a flows downwardly toward the connection pipe 118d after flowing around the second valve body 120 as shown in FIG. 8. In the third embodiment, FIG. 7 shows a state where the valve ports 119a, 120a are closed by the first and second valve bodies 119, 120, respectively, when the operation of the second pump 240 stops.

Figure 9:
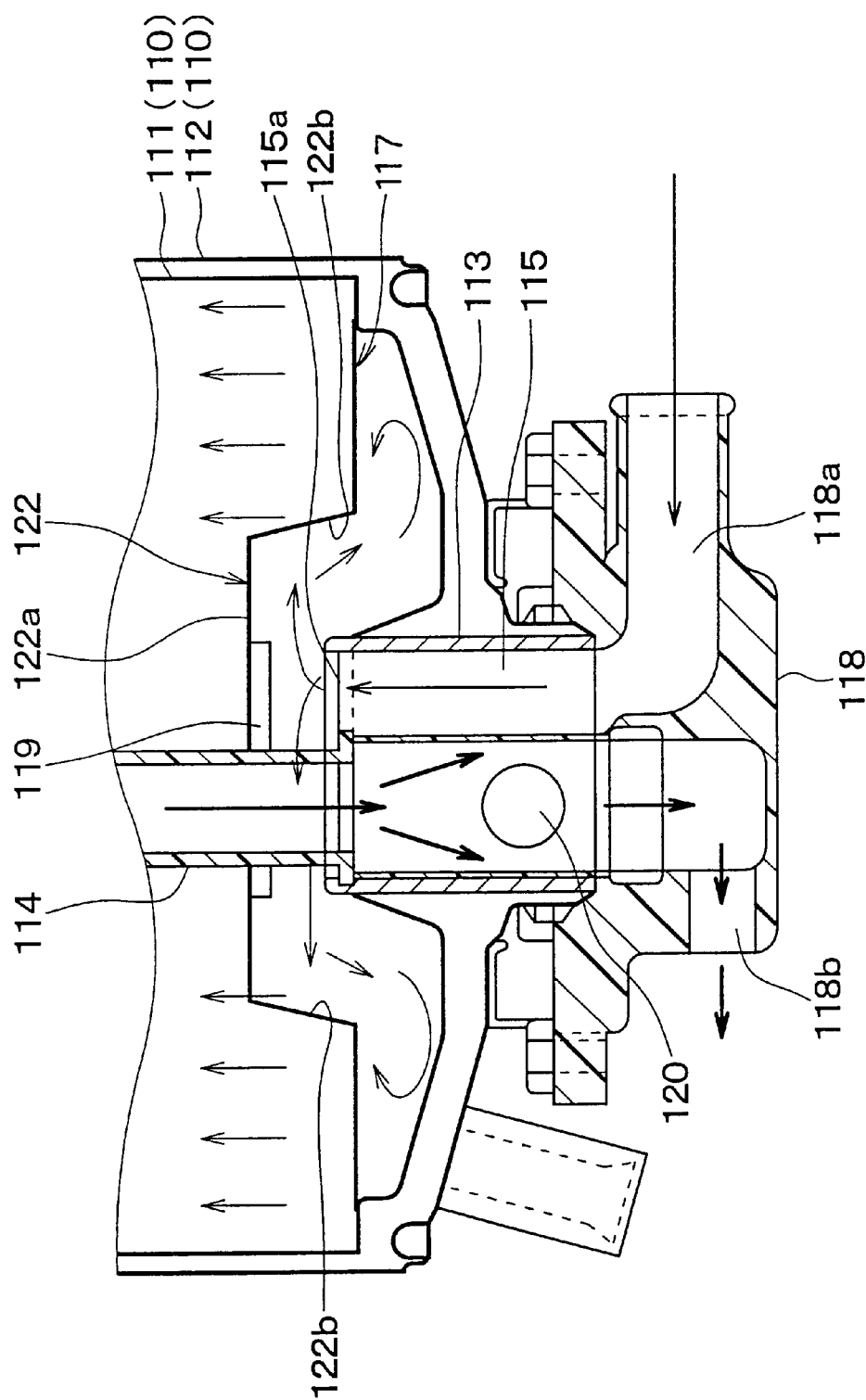
FIG. 9 is a schematic diagram showing a heat storage tank according to a fourth preferred embodiment of the present invention.

A fourth preferred embodiment of the present invention will be now described with reference to FIG. 9. In the fourth embodiment of the present invention, a collision member 122, to which cooling water flowing from a flow port 115a of the flow passage 115 collides, is provided at a position near the flow port 115a of the flow passage 115. The collision member 122 and the plate member 117 described in the first embodiment can be integrally formed by a stainless metal, for example.

The collision member 122 includes a cover member 122a disposed opposite to the flow port 115a to have a predetermined space between the flow port 115a and the cover member 122a, and a guide portion 122b connected to the cover member 122a to extend downwardly. That is, as shown in FIG. 9, the guide portion 122b connected to the cover member 122a is disposed to cover the flow port 115a around the entire outer periphery of the flow port 115a at a position away from the flow port 115a by a predetermined dimension. Further, in the fourth embodiment, the plate member 117 is provided around the flow port 115a to extend from an end portion of the guide portion 122b to an inner wall of the tank body 110. The cover member 122a of the collision member 122 is used as a stopper member for preventing the first valve body 119 from being away from the flow port 115a by more than a predetermined dimension.

For improving the heat insulating performance of the heat storage tank 100, the opening portion of the tank body 110 is made as small as possible. However, in a case where the opening area of the opening portion of the tank body 110 is made smaller, when the flow amount of cooling water flowing into the tank body 110 is made larger, a flow rate of cooling water flowing into the tank body 110 from the opening portion is increased, and cooling water passes through the holes 117a of the plate member 117 when the plate member 117 described in the first embodiment is disposed in the heat storage tank 100. In this case, cooling water in the tank body 110 is mixed, and cooling water may forcedly circulate in the tank body 110.

However, in the fourth embodiment of the present invention, the collision member 122 having an approximate cup shape is provided around the flow port 115a. Therefore, even when a water flow with a high flow rate is injected toward an upper side from the flow port 115a, the water flow collides with the cover member 122a and is turned by an approximate right angle or 90°, and thereafter turned downwardly. Accordingly, after the flow rate of cooling water from the flow port 115a is sufficiently reduced by the collision member 122, the water flow is introduced to a lower side of the plate member 117.

According to the fourth embodiment of the present invention, the upwardly injected flow of cooling water can be accurately changed so that cooling water from the flow port 115a is introduced at the lower side of the plate member 117. Therefore, even when cooling water having a large flow rate is injected from the flow port 115a, it can prevent cooling water in the tank body 110 from being mixed, while heat-insulating performance of the heat storage tank 100 can be improved.

Further, because the guide portion 122b is provided along all the outer periphery of the flow port 115a, the mixing of cooling water in the tank body 110 can be further effectively prevented.

Figure 10A:
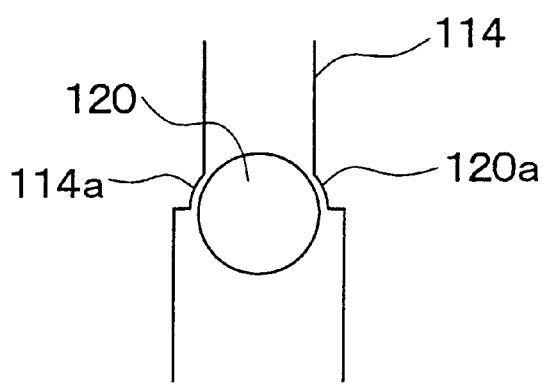
FIGS. 10A and 10B are schematic enlarged diagrams each showing a second pipe member for a heat storage tank according to a fifth preferred embodiment of the present invention.
Figure 10B:
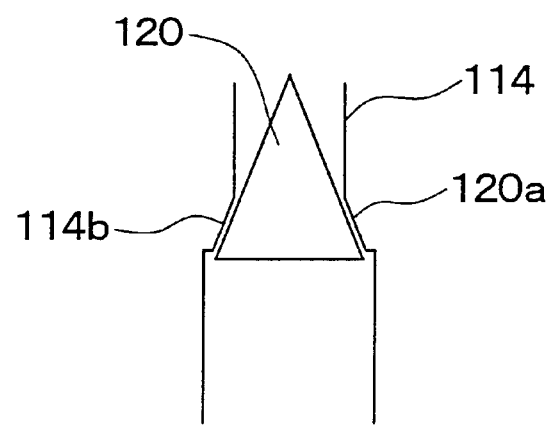

A fifth preferred embodiment of the present invention will be now described with reference to FIGS. 10A and 10B. As shown in FIGS. 10A and 10B, a valve seat 114a, 114b is provided to define the valve port 120a, so that a surface of the second valve body 120 contacts the valve seat 114a, 114b. For example, when the second valve body 120 has a sphere shape as shown in FIG. 10A, the valve seat 114a is formed to have a spherical surface. On the other hand, when the valve body 120 has a conical shape as shown in FIG. 10B, the valve seat 114b is formed to have a conical tapered shape.

When the second pipe member 114 (flow passage) is closed by the second valve body 120, heat in the tank body 110 of the heat storage tank 100 is radiated to an outside of the heat storage tank 100 through a position (valve port 120a) in the second pipe member 114, on which the second valve body 120 contacts. In the fifth embodiment of the present invention, the valve seat 114a, 114b contacting the second valve body 120 in the second valve port 120a is provided. That is, by providing the valve seat 114a, 114b, a contacting area of the second valve body 120 contacting the second pipe member 114 can be increased, and a heat-transmitting path for transmitting heat from the interior of the heat storage tank 100 to the exterior of the heat storage tank 100 can be elongated. Therefore, heat-insulating capacity of the heat storage tank 100 can be improved.

In the fifth embodiment of the present invention, the shape of the valve seat 114a, 114b is not limited to the shapes shown in FIGS. 10A and 10B, but can be suitably changed in accordance with the shape of the valve body 120.

Although the present invention has been fully described in connection with the preferred embodiments thereof with reference to the accompanying drawings, it is to be noted that various changes and modifications will become apparent to those skilled in the art.

For example, in the above-described first embodiment of the present invention, the first valve body 119 and the second valve body 120 are made of a rubber (e.g., EPDM). However, the valve bodies 119, 120 can be made of the other material such as a metal, a resin, a foam member, a hollow member and a sponge member. Further, the shapes of the first and second valve bodies 119, 120 can be changed to the other shapes such as a conical shape, a cylindrical shape and a fusiform shape.

In the above-described embodiments of the present invention, the opening portion of the tank body 110 is provided at a lower side position of the tank body 110 so that the housing 118 and the first pipe member 113 are positioned at the lower side of the tank body 110. However, the housing 118 and the opening of the tank body 110 may be positioned at an upper side of the tank body 110 or may be positioned at the other side.

In the above-described embodiments of the present invention, the flow passage is closed when the dynamic pressure is smaller than the predetermined pressure by using the density difference between the cooling water and the first and second valve bodies 119, 120. However, an elastic member such as a spring can be disposed so that a force opposite to the dynamic pressure is applied to the first or second valve body 119, 120. In this case, the flow passage is opened and closed by the valve body 119 or 120 by a balance between the force due to the dynamic pressure and a force due to the elastic member. Alternatively, an elastic member can be provided, so that the flow passage is opened and closed by a balance of the force due to the elastic member, the force of the dynamic pressure and the density difference between the cooling water and the valve body 119, 120.

In the above-described embodiment of the present invention, both the valve bodies 119, 120 are provided in both the flow passages in the heat storage tank 100 at an inlet position and an outlet position. However, one valve body can be provided for one flow passage in the heat storage tank 100.

Such changes and modifications are to be understood as being within the scope of the present invention as defined by the appended claims.

What is claimed is:

1. A heat storage tank for storing a cooling liquid of a liquid-cooled engine in a cooling liquid- circuit, the heat storage tank comprising:
   a tank body in which the cooling liquid is stored;
   a connection member connected to the tank body for defining a fluid passage communicating with an interior of the tank body through which cooling liquid in the cooling liquid circuit flows;
   a valve body for opening and closing the fluid passage, wherein:
     the valve body is constructed to open the fluid passage when a dynamic pressure due to the cooling liquid, larger than a predetermined pressure, is applied to the valve body, and to close the fluid passage when the dynamic pressure smaller than the predetermined pressure is applied to the valve body;
     the connection member is disposed so that cooling liquid in the cooling liquid circuit flows into the tank body from below upwardly through the fluid passage;
     the valve body has a density larger than that of the cooling liquid to have a density difference between the valve body and the cooling liquid; and
     the valve body is disposed to open the fluid passage when the dynamic pressure larger than the predetermined pressure is applied to a lower side of the valve body, and to close the fluid passage by the density difference when the dynamic pressure applied to the lower side of the valve body is smaller than the predetermined pressure.

2. The heat storage tank according to claim 1, wherein the valve body is constructed to close the fluid passage by a pressure due to a weight of the valve body and a weight of the cooling liquid when the dynamic pressure applied to the valve body is smaller than the predetermined pressure.

3. The heat storage tank according to claim 1, wherein the valve body is constructed to close the fluid passage by a pressure due to a weight of the valve body and a weight of the cooling liquid when the dynamic pressure applied to the valve body is smaller than the predetermined pressure.

4. The heat storage tank according to claim 1, wherein the fluid passage has a valve port defined by a wall portion which contacts the valve body when the fluid passage is closed by the valve body.

5. The heat storage tank according to claim 4, wherein the wall portion defining the valve port has a valve seat which contacts a surface of the valve body when the fluid passage is closed by the valve body.

6. A heat storage tank for storing a cooling liquid of a liquid-cooled engine in a cooling liquid circuit, the heat storage tank comprising:
   a tank body in which the cooling liquid is stored;
   a connection member connected to the tank body for defining a fluid passage communicating with an interior of the tank body through which cooling liquid in the cooling liquid circuit flows;
   a valve body for opening and closing the fluid passage, wherein:
   the valve body is constructed to open the fluid passage when a dynamic pressure due to the cooling liquid, larger than a predetermined pressure, is applied to the valve body, and to close the fluid passage when the dynamic pressure smaller than the predetermined pressure is applied to the valve body;
   the connection member is disposed so that cooling liquid in the tank body flows out from an upper side downwardly through the fluid passage;
   the valve body has a density smaller than that of the cooling liquid to have a density difference between the cooling liquid and the valve body; and
   the valve body is disposed to open the fluid passage when the dynamic pressure larger than the predetermined pressure is applied to an upper side of the valve body, and to close the fluid passage by the density difference when the dynamic pressure applied to the upper side of the valve body is smaller than the predetermined pressure.

7. A heat storage tank for storing a cooling liquid of a liquid-cooled engine in a cooling liquid circuit, the heat storage tank comprising:
   a tank body in which the cooling liquid is stored;
   a connection member connected to the tank body for defining a fluid passage communicating with an interior of the tank body through which cooling liquid in the cooling liquid circuit flows;
   a valve body for opening and closing the fluid passage, wherein the valve body is constructed to open the fluid passage when a dynamic pressure due to the cooling liquid, larger than a predetermined pressure, is applied to the valve body, and to close the fluid passage when the dynamic pressure smaller than the predetermined pressure is applied to the valve body; and
   a collision member disposed in the tank body so that cooling liquid flowing into the tank body from a fluid port of the fluid passage collides with the collision member, wherein,
   the collision member has a cover member disposed opposite to the flow port at a position away from the flow port by a predetermined distance, and a guide member extending from the cover member to a peripheral side of the fluid port.

8. The heat storage tank according to claim 7, wherein the guide member is disposed at a position away from the flow port by a predetermined distance to cover the flow port along an entire outer periphery of the fluid port.

9. The heat storage tank according to claim 7, further comprising
   a plate member having a plurality of holes, for restricting mixing of cooling liquid in the tank body when the cooling liquid flows into the tank body from the fluid port,
   wherein the plate member is disposed between the collision member and an inner wall of the tank body around the fluid port.

10. The heat storage tank according to claim 9, wherein the collision member and the plate member are formed integrally.

11. A heat storage tank for storing a cooling liquid of a liquid-cooled engine in a cooling liquid circuit by heat insulation, the heat storage tank comprising:
    a tank body in which the cooling liquid is stored;
    a connection member connected to the tank body for defining a first fluid passage through which cooling liquid in the cooling liquid circuit flows into the tank body upwardly from a lower side, and a second fluid passage through which cooling liquid flows out from the tank body downwardly from an upper side;
    a first valve body for opening and closing the first fluid passage; and
    a second valve body for opening and closing the second fluid passage, wherein:
    the first valve body has a density larger than that of the cooling liquid, and the second valve body has a density smaller than that of the cooling liquid;
    the first valve body is disposed to open the first fluid passage when a dynamic pressure due to the cooling liquid, larger than a predetermined pressure, is applied to the first valve body from a lower side, and to close the first fluid passage when the dynamic pressure applied to the first valve body is smaller than the predetermined pressure; and
    the second valve body is disposed to open the second fluid passage when the dynamic pressure larger than the predetermined pressure is applied to the second valve body from an upper side, and to close the second fluid passage when the dynamic pressure applied to the second valve body is smaller than the predetermined pressure.

12. The heat storage tank according to claim 11, wherein the first fluid passage and the second fluid passage are provided at a lower side of the tank body to communicate inside the tank body.

13. The heat storage tank according to claim 11, further comprising.
    a collision member disposed in the tank body so that cooling liquid flowing into the tank body from a fluid port of the first fluid passage collides with the collision member, wherein,
    the collision member has a cover member disposed opposite to the flow port at a position away from the flow port by a predetermined distance, and a guide member extending from the cover member to a peripheral side of the fluid port.

14. The heat storage tank according to claim 13, wherein the guide member is disposed at a position away from the flow port by a predetermined distance to cover the flow port along an entire outer periphery of the fluid port.

15. The heat storage tank according to claim 13, further comprising
 a plate member having a plurality of holes, for restricting a mixing of cooling liquid in the tank body when the cooling liquid flows into the fluid tank from the fluid port,
 wherein the plate member is disposed between the collision member and an inner wall of the tank body around the fluid port.

16. The heat storage tank according to claim 15, wherein the collision member and the plate member are formed integrally.

17. The heat storage tank according to claim 11, wherein:
 the first fluid passage has a first valve port defined by a first wall portion which contacts a surface of the first valve body when the first fluid passage is closed by the first valve body; and
 the first fluid passage has a second valve port defined by a second wall portion which contacts a surface of the second valve body when the second fluid passage is closed by the second valve body.

* * * * *